Patented Aug. 7, 1951

2,563,524

UNITED STATES PATENT OFFICE 2,563,524

PRODUCTION OF POLYMERS AND COPOLYMERS OF ACENAPHTHYLENE

Ralph G. Flowers and Edsall D. Elliott, Jr., Pittsfield, Mass., assignors to General Electric Company, a corporation of New York No Drawing. Application January 3, 1949,
Serial No. 69,069

5 Claims. (Cl. 260—83.7)

This invention relates to the production of synthetic compositions and more particularly to polymers of acenaphthylene and copolymers of acenaphthylene with other polymerizable compounds including styrene, isoprene, and butadiene.

Heretofore acenaphthylene has been polymerized to produce polymers of low molecular weight of the order of 3000 (Ber. 1914, 47, 1685) by heating the acenaphthylene in solution to about 100° C. to 300° C. The production of polymers of acenaphthylene having molecular weights of up to over 300,000 is described in Patent 2,445,181—Miller et al., July 13, 1948, assigned to the same assignee as the present invention. By the latter method the acenaphthylene in solution is treated at temperatures ranging well below 0° C. with a stream of $BF_3$ gas.

In accordance with this invention, high molecular weight polymers and copolymers of acenaphthylene are produced by a chemical reaction which takes place at easily obtainable and convenient temperatures.

More particularly, it has been found that high molecular weight polymers and copolymers of acenaphthylene may be prepared very readily by reacting the material or materials in an emulsified state. Specifically, it has been found that polymerization to a high molecular weight may be effected by dissolving the monomer or monomers in an inert solvent and agitating under heat in the presence of an aqueous phase containing an emulsifying agent and a catalyst.

In order that those skilled in the art may readily understand the invention, the following specific examples are given by way of illustration.

EXAMPLE 1

Ten parts by weight of acenaphthylene were dissolved in 10 parts by volume of ethyl benzene and emulsified with 100 parts by volume of a stearic acid emulsion solution. The stock emulsion solution consisted of 600 parts by volume of water, 14 parts by weight of stearic acid, 6 parts by weight of potassium hydroxide and 15 parts by volume of a 10 per cent solution of an emulsion sol containing 2.22 per cent stearic acid, 0.95 per cent potassium hydroxide and 0.24 per cent dioctyl sodium sulfosuccinate. 0.4 part by weight of potassium persulfate was added as a catalyst to the emulsion mixture which was agitated in a closed container for about 15 hours at 45° C. The resulting polymer was coagulated from the solution by dropping the solution slowly into a dilute strong acid. The coagulated polymer was then filtered off, dissolved in a non-polar solvent, such as benzene, and precipitated into methyl alcohol. A final yield of 89 per cent polyacenaphthylene was obtained.

EXAMPLE 2

10 parts by weight of acenaphthylene were dissolved in 5 parts by volume of benzene and emulsified with 100 parts by volume of the above-described emulsion solution. 0.4 part by weight of potassium persulfate was added and the emulsion agitated for 63 hours at 45° C. The resultant polymer was coagulated in dilute hydrochloric acid, filtered off and purified by dissolving in benzene and precipitating into methyl alcohol. The final yield of pure polyacenaphthylene was 29 per cent of the theoretical.

EXAMPLE 3

10 parts by weight of acenaphthylene were dissolved in 5 parts by volume of ethyl benzene, emulsified as above and agitated for 63 hours at 45° C. with 0.4 part by weight of potassium persulfate. The yield of polyacenaphthylene was 97 per cent.

EXAMPLE 4

10 parts by weight of acenaphthylene were dissolved in 5 parts by volume of ethyl benzene, emulsified as above and agitated for 15 hours at 45° C. with 0.4 part by weight of potassium persulfate. The yield of polyacenaphthylene was 98 per cent.

EXAMPLE 5

10 parts by weight of acenaphthylene were added to 1 part by volume of ethyl benzene, emulsified as above and agitated for 63 hours at 45° C. with 0.4 part by weight of potassium persulfate. The yield of polyacenaphthylene was 88 per cent.

EXAMPLE 6

10 parts by weight of acenaphthylene were added to 20 parts by volume of ethyl benzene and emulsified in the usual manner. After adding 0.4 part by weight of potassium persulfate, the mixture was agitated for 63 hours at 45° C. The final yield of polyacenaphthylene was 83 per cent.

EXAMPLE 7

10 parts by weight of acenaphthylene were added to one part by weight of benzene and emulsified in the usual manner. After adding 0.4 part by weight of potassium sulfate, the mixture was agitated for 63 hours at 45° C. The final yield of polyacenaphthylene was 45 per cent.

Example 7 was repeated using varying amounts of benzene as the inert solvent. Using 10, 15 and 20 cc. of benzene, all other conditions being the same as in Example 7, the yields of polyacenaphthylene were less than 10 per cent.

A series of experiments were carried out using no inert solvent at all and varying the catalyst from none at all to 1.2 parts by weight of the potassium persulfate. The yields varied from less than 10 per cent to about 70 per cent, even the latter yield being unsatisfactory in a batch process such as the present one in which large yields are necessary.

From a consideration of the above examples, it will be apparent that acenaphthylene does not lend itself to polymerization by the usual emulsion polymerization process. Unexpectedly, however, acenaphthylene does lend itself to the formation of large yields of polymers of high molecular weight when the monomeric material is dissolved in an inert solvent and agitated with heat in the presence of an aqueous phase containing an emulsifying agent and a catalyst.

In general, it has been found that any alkyl substituted liquid aromatic compound, and in particular ethyl substituted aromatics, may be used as the inert solvent for producing large yields of polyacenaphthylene. However, from the standpoint of such considerations as availability, ethyl benzene is the solvent preferably employed.

From the above examples it will also be seen that the time of reaction should be at least fifteen hours. While the emulsified mixture may be reacted for a longer time as in some of the examples, there is no real advantage in so doing since the yields are about the same.

At least 0.4 part by weight of catalyst should be used and the preferred range is from 0.4 to 0.6 part by weight of such material. While more than 0.6 part by weight may be used, it has been found that the excess over the preferred range does not increase the yield. Catalysts which may be used in addition to potassium persulfate are benzol peroxide, tertiary butyl hydroperoxide, tertiary butyl perbenzoate, tertiary butyl diperphthalate, acetyl peroxide, acetyl benzoyl peroxide, peracetic acid, lauroyl peroxide, butyryl peroxide and the alkali metal persulfates, among others.

While a reaction temperature of 45° C. is preferred, the temperature may be varied from about 20° C. to about 80° C., the time of reaction being adjusted accordingly.

The emulsifying solution given in Example 1 is typical of any of a number of such solutions which may be used. Thus, any of the higher fatty acids may be used in lieu of stearic acid, any of the alkali metal hydroxides function suitably in lieu of potassium hydroxide, and other wetting agents besides the specific example given may be employed.

Polymers of acenaphthylene prepared according to the process of this invention are characterized by a high molecular weight. Determinations made using a Fuoss-Mead Osmometer and incorporating the method described in the "Journal of Physical Chemistry," vol 47, No. 1, January 1943, pp. 59-70, showed a molecular weight of over 300,000. Such polymers have high softening points ranging at about 220° C. and may be used to advantage for electrical insulation at high temperatures.

Copolymers of acenaphthylene with other compounds may be prepared by following the teachings of this invention. However, surprisingly, it has been found that the number of substances which will copolymerize with acenaphthylene using the present emulsion process is rather limited, styrene, isoprene and butadiene being the only compounds found which would so form copolymers. Among those monomers which were found to be unsuitable for copolymerization with acenaphthylene by the present process are: indene, N-vinylcarbazole, N-allylcarbazole, 3-vinylphenoxthin, furan, acrylonitrile, N-vinylphthalimide and vinyl acetate. The following examples will illustrate the technique followed in preparing such copolymers as are possible.

EXAMPLE 8

25 parts by weight of acenaphthylene dissolved in 10 parts by volume of benzene, 100 parts by volume of standard emulsion solution, 11.3 parts by weight of isoprene and 3 parts by weight of potassium persulfate were agitated for 63 hours at 45° C. in a closed container. The resultant latex-like material was coagulated with dilute hydrochloric acid, dissolved in benzene, precipitated into methyl alcohol, filtered, redissolved in benzene and refiltered. A film cast from the benzene solution possessed a softening point of approximately 110° C. when tested on a hot plate. The film was pliable and elastic.

Similar films consisting of copolymers of acenaphthylene and butadiene and styrene have been prepared, the data for such reactions appearing in table below.

Table

| Exp. No. | Parts by Weight, Monomer #1 Acenaphthylene | Parts by Weight, Monomer #2 | Parts by Weight, Catalyst K₂S₂O₈ | Time Agit., Hours | Parts by Volume, Solvent | Per Cent Yield |
|---|---|---|---|---|---|---|
| 1 | 25 | 17.1 Styrene | .5 | 15 | None | 81 |
| 2 | 25 | 17.1 Styrene | .5 | 15 | 20 Benzene | |
| 3 | 9.9 | 27 Styrene | .4 | 65 | None | 80.6 |
| 4 | 25 | 17.1 Styrene | .4 | 16 | 1 Benzene | |
| 5 | 25 | 17.1 Styrene | .4 | 15 | 5 Benzene | 31 |
| 6 | 10 | 6.84 Styrene | .4 | 16 | 4 Ethyl Benzene | 95 |
| 7 | 25 | 11.3 Isoprene | .3 | 63 | 10 Benzene | 61 |
| 8 | 25 | 6.9 Butadiene | .4 | 16 | 5 Benzene | 56 |

While hydrochloric acid is very satisfactory as a strong acid coagulant for the polymer, any other strong acids will serve as well. Likewise, other purifying coagulants may be used in lieu of methyl alcohol such as ethyl alcohol, acetone, propyl alcohol, etc.

It will be noted that the acenaphthylene-styrene copolymerization proceeds quite well without additional inert solvent, the styrene itself acting in this capacity in the initial stages. However, the addition of ethyl benzene substantially increased the yield.

As in the case of the formation of polyacenaphthylene, the use of liquid alkyl substituted aromatic compounds increases the yield of copolymers of acenaphthylene, ethyl benzene again being the preferred inert solvent. Attempts to produce copolymers of acenaphthylene without the use of an inert solvent were unsuccessful.

The proportions of ingredients given in the above examples for the polymer and copolymers of acenaphthylene are illustrative only, variations resulting in changes in the physical characteristics of the polymerized products which enable them to be adapted to various uses. In general, the polymers and copolymers of this invention find their widest field of use in the formation of separate films, and films on paper or other base material as impregnants and in general to the same uses described in Patent 2,445,181, July 13, 1948, assigned to the same assignee as the present invention.

The process of this invention provides an easy method of forming useful high molecular weight polymers and copolymers of acenaphthylene at the easily attained and maintained temperature of 45° C. Heretofore, in preparing high molecular weight polymers of acenaphthylene, which is a solid at ordinary temperatures, it has either been necessary to heat the material above its melting point of 92° C., as in the Berichte reference above, or as in the process of Patent 2,445,181 to treat the acenaphthylene in solution at temperatures of 0° C. and below. On the other hand, the process of the present invention is carried out at easily attainable temperatures ranging from about 20° C. to 80° C. and preferably at about 45° C. There is no need to maintain high polymerization temperatures which may result in charring and discolorization of the product. Neither is there any need of maintaining very low and difficultly obtainable low temperatures.

What we claim as new and desire to secure by Letters Patent of the United States is:

1. The process of producing synthetic compositions which comprises forming an aqueous emulsion of a mixture containing (1) acenaphthylene, (2) ethyl benzene, (3) an emulsifying agent for (1) and (2), and (4) a peroxide catalyst, and heating the emulsion to from 20° to 80° C. until polymerization of the acenaphthylene is attained.

2. The process of producing synthetic compositions which comprises forming an aqueous emulsion of a mixture comprising (1) acenaphthylene, (2) a compound selected from the group consisting of isoprene, butadiene, and styrene, (3) ethyl benzene, (4) an emulsifying agent for (1), (2) and (3), and (5) a peroxide catalyst, and thereafter heating at 45° C. and agitating said mixture for at least 15 hours.

3. The process of producing synthetic compositions which comprises forming an aqueous emulsion comprising (1) 10 parts by weight of acenaphthylene, (2) from one to 20 parts by volume of ethyl benzene, (3) an emulsifying agent for (1) and (2), and (4) at least 0.4 part by weight of a peroxide catalyst, and thereafter heating and agitating said mixture at about 45° C. for at least 15 hours.

4. The process of producing synthetic compositions which comprises forming an aqueous emulsion comprising (1) 10 parts by weight of acenaphthylene, (2) from one to 20 parts by volume of ethyl benzene, (3) an emulsifying agent for (1) and (2), and (4) at least 0.4 part by weight of a peroxide catalyst and thereafter heating and agitating said mixture at about 20° C. to 80° C. until polymerization is attained.

5. The process of producing synthetic compositions which comprises forming an aqueous emulsion comprising (1) acenaphthylene, (2) a compound selected from the group consisting of isoprene, butadiene, and styrene, (3) ethyl benzene, (4) an emulsifying agent for (1), (2) and (3), and (5) a peroxide catalyst, and thereafter heating at 20° C. to 80° C. and agitating said mixture for at least 15 hours.

RALPH G. FLOWERS.
EDSALL D. ELLIOTT, Jr.

REFERENCES CITED

The following references are of record in the file of this patent:

UNITED STATES PATENTS

| Number | Name | Date |
| --- | --- | --- |
| 2,431,373 | D'Alelio | Nov. 25, 1947 |
| 2,445,181 | Miller et al. | July 13, 1948 |

OTHER REFERENCES

Hey and Walter, Chem. Rev. 21, 169 (1937).
McClure et al., Can. Journ. Res. 20B, 103 (1942).